United States Patent [19]

Nabae et al.

[11] 4,032,831
[45] June 28, 1977

[54] INVERTER APPARATUS

[75] Inventors: Akira Nabae; Takeo Shimamura; Ichirou Shimizu, all of Yokohama; Ryoichi Kurosawa, Tokyo, all of Japan

[73] Assignee: Tokyo Shibaura Denki Kabushiki Kaisha, Kawasaki, Japan

[22] Filed: Nov. 24, 1975

[21] Appl. No.: 635,156

[52] U.S. Cl. .................................. 363/2; 318/227; 363/41
[51] Int. Cl.² ......................................... H02M 7/00
[58] Field of Search ........... 318/227, 345 R; 321/5, 321/45 C, 45 ER, 9 A

[56] References Cited

UNITED STATES PATENTS

| 3,321,697 | 5/1967 | Etter | 321/45 C |
|---|---|---|---|
| 3,340,453 | 9/1967 | Bradley et al. | 321/5 |
| 3,388,310 | 6/1968 | Etter | 321/5 |
| 3,399,336 | 8/1968 | Koppelmann | 321/5 |
| 3,444,450 | 5/1969 | Koppelmann | 321/5 X |
| 3,588,667 | 6/1971 | Duff et al. | 321/45 C X |
| 3,614,590 | 10/1971 | Kernick | 321/9 A |
| 3,621,366 | 11/1971 | Duff | 321/45 ER X |
| 3,622,863 | 11/1971 | King | 321/45 ER |
| 3,710,229 | 1/1973 | Jessee | 321/9 A |

OTHER PUBLICATIONS

Electronics Design 25, "Which dc/ac Inverter," George A. O'Sullivan, Dec. 6, 1974, pp. 54–59.

Primary Examiner—William M. Shoop
Attorney, Agent, or Firm—Stevens, Davis, Miller & Mosher

[57] ABSTRACT

In an inverter apparatus including a plurality of parallel branch circuits connected across a D.C. source, each including a pair of serially connected controllable switching elements, and a plurality of semiconductor elements connected in parallel opposition with respective switching elements, a D.C. reactor is connected on the D.C. side or A.C. side of the inverter and a circuit is connected across the D.C. reactor for preventing attenuation of the current flowing through the D.C. reactor during the OFF period of the switching elements. A source of control pulses is provided for rendering ON respective controllable switching elements each for a 120° interval of the output alternating current. The source of control pulse includes means for chopping the current flowing through each controllable switching element at a predetermined modulation frequency for the former or latter 60° of the 120° interval.

10 Claims, 12 Drawing Figures

U PHASE OUTPUT VOLTAGE

|—120°—|  →TIME

U PHASE OUTPUT CURRENT

→TIME

INVERTER APPARATUS

BACKGROUND OF THE INVENTION

This invention relates to improved inverter apparatus.

Inverters capable of producing alternating currents of variable frequency and variable voltage are used for operating induction motors for driving electric motor cars, electric locomotives and railway cars which are fed from DC sources.

Variable frequency, variable voltage inverters can be classified into the following two types according to the method of varying the output voltage: (1) a variable DC voltage system and (2) a pulse width modulated system. According to a typical system of the former type the DC voltage is varied by effecting a gate control of an AC-DC converter and the output frequency of the inverter is varied by controlling the operating frequency of a DC-AC converter or inverter. According to the latter type, the DC output voltage from the AC-DC converter is maintained at a constant value whereas the output voltage and frequency of the inverter are varied by the inverter alone. Accordingly, in the former type, the variations in the output voltage and frequency of the inverter are performed in two steps whereas in the latter type such variations can be effected in only one step. Thus, the pulse width modulated type is suitable for rapid and precise control of the motor speed and is characterized in that there is no problem of shortage of the commutation voltage caused by the decrease in the DC voltage and that the power factor of the source is high. For this reason, the pulse width modulated type inverters increase their field of application which is aided by recent development in improved control technique.

This invention relates to improvements of the pulse width modulated type inverters.

When classified according to the output waveform, inverters are classified into (1) constant voltage type inverters and (2) constant current type inverters. As is well known in the art, in the constant voltage type inverter, the load side impedance as seen from the source side is low and since free wheeling diodes are connected in parallel oposition with the main semiconductor elements, the source side impedance as seen from the load side is also low. Usually an output of a rectangular wave form having a conduction width of 180° is obtained.

The inverter of this type can be used as a pulse width modulated inverter as shown in FIG. 1 of the accompanying drawing in which 6 thyristors Qu, Qv, Qw, $Q\bar{u}$, $Q\bar{v}$ and $Q\bar{w}$ are connected in a bridge circuit and free wheeling diodes Du, Dv, Dw, $D\bar{u}$, $D\bar{v}$ and $D\bar{w}$ are connected in parallel opposition with respective thyristors. Terminals U, V, W of a three phase induction motor IM is connected to the AC output terminals of the inverter which is energized from a constant voltage DC source B. Since this type of the inverter is well known, the commutating circuit and the gate control circuit for the thyristors are not shown for the purpose of simplicity.

FIGS. 2(a) and 2(b) show the waveforms of the output voltage and output current of phase U where the output frequency of the inverter is 1/6 of the modulating frequency of the pulse used to perform the gate control of the thyristers. As can be noted from FIGS. 2a and 2b, as the output voltage and current contain a large pulsating components of high frequency, the iron loss, copper loss, efficiency and the torque of the motor decrease.

In the constant current inverter, since a large DC reactor is connected between the DC source and the inverter not only the load side impedance as seen from the source side but also the source side impedance as seen from the load side are high so that an output current of rectangular waveform having a conduction width of 120° is obtained. This type of the inverter can not be used as a pulse wave modulated inverter.

SUMMARY OF THE INVENTION

Accordingly, it is an object of this invention to provide a novel pulse width modulated inverter which can obviate difficulties mentioned above and can produce an output wave form similar to that of the constant current type inverter.

Another object of this invention is to provide an improved inverter apparatus capable of decreasing the loss and increasing the torque of an AC motor energized by the inverter.

A further object of this invention is to provide an improved inverter apparatus of improved efficiency that can improve the current utilization factor of the switching elements and can decrease the capacity of the commutating circuit.

According to this invention these and further objects can be accomplished by providing inverter apparatus comprising a source of direct current, a plurality of parallel branch circuits connected across the source of direct current, each branch circuit including a pair of serially connected controllable switching elements, a plurality of diodes connected in parallel opposition with respective controllable switching elements, an alternating current load connected to the junctures between said pair of serially connected controllable switching element, a D.C reactor connected between the source of direct current and the alternating current load, and means connected across the D.C. reactor for preventing attenuation of the current flowing through the D.C. reactor. The D.C. reactor is connected on the DC or AC side of the inverter and the last mentioned means includes a diode which may be one of said diodes or an independent diode.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 3:
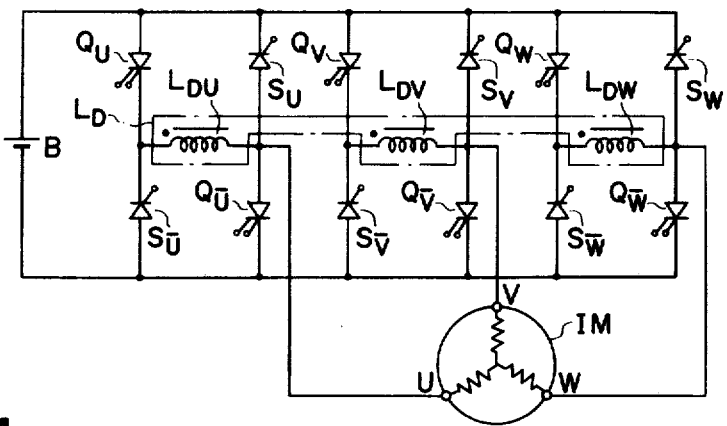
FIG. 3 is a connection diagram of one example of the pulth width modulated type inverter embodying the invention.

FIG. 3 shows a connection diagram of one example of the pulse width modulated type inverter type embodying the invention in which a DC reactor is connected on the load side. As shown in FIG. 3, the inverter comprises 6 main controllable switching elements Qu, Qv, Qw, $Q\bar{u}$, $Q\bar{v}$ and $Q\bar{w}$ which are connected in a bridge circuit, 6 auxiliary switching elements Su, Sv, Sw, $S\bar{u}$, $S\bar{v}$ and $S\bar{w}$, which are connected in parallel opposition with respective main switching elements, and a DC reactor $L_D$ having a plurality of windings $L_{Du}$, $L_{Dv}$ and $L_{Dw}$ wound on a common iron core, as shown by dot and dash lines, and respectively connected between a pair of branch circuits each including one main switching element and one auxiliary switching element which are connected in series. For example, reactor winding $L_{Du}$ is connected between the juncture between the main switching element Qu and the auxiliary switching element $S\bar{u}$ which are connected in series opposition and the juncture between the auxiliary switching element Su and the main switching element $Q\bar{u}$ which are also connected in series opposition. Each auxiliary switching element operates to cooperate with each reactor winding to pass a free wheeling current through the load during the OFF period of the main switching element associated therewith. Each main switching element comprises a semiconductor element having switching capability, for example a transistor, a gate turn off (GTO) thyristor or a silicon controlled rectifier (SCR) provided with a commutating device which may comprise a series circuit including a commutating capacitor and an auxiliary thyristor and connected in parallel with the SCR. The auxiliary switching element may comprise a semiconductor element, such as a SCR or gate turn off diode.

Instead of connecting the phase terminals $u$, $v$ and $w$ of the induction motor IM to the righthand terminals of respective reactor windings $L_{Du}$, $L_{Dv}$ and $L_{Dw}$ as shown in FIG. 3, it will be clear that the phase terminals may be connected to the lefthand terminals of respective reactor windings.

Figure 4:
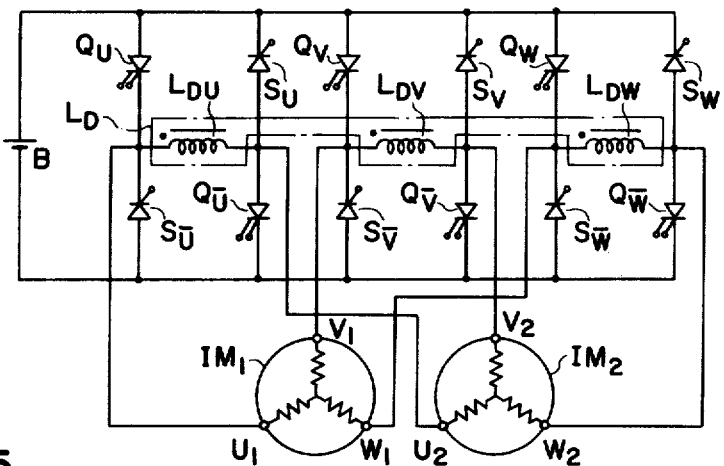
FIG. 4 is a connection diagram of a modification of the inverter shown in FIG. 3 in which two induction motors are connected across the AC output terminals of the inverter.

FIG. 4 shows a modification of the embodiment shown in FIG. 3 in which phase terminals $U_1$, $V_1$ and $W_1$ and $U_2$, $V_2$ and $W_2$ of two induction motors $IM_1$ and $IM_2$ are connected to opposite sides of respective reactor windings $L_{Du}$, $L_{Dv}$ and $L_{Dw}$. This connection not only improves the utilization factor of the reactor but also balance the load currents of two motors.

Figure 5:
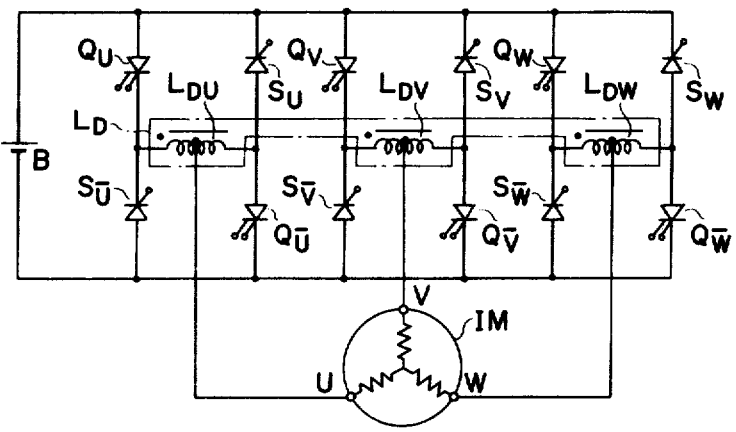
FIG. 5 is a connection diagram of a modification of the inverter shown in 3 in which phase terminals of the induction motor are connected to the midpoints of respective reactor windings.

In another modification shown in FIG. 5 the phase terminals U, V and W of the induction motor IM are connected to the midpoints of respective reactor windings $L_{Du}$, $L_{Dv}$ and $L_{Dw}$. This modification operates in the same manner as the embodiment shown in FIG. 3. Although the load current flows through respective halves of two reactor windings the total reactance for the load current is the same for both connections.

Figure 6:
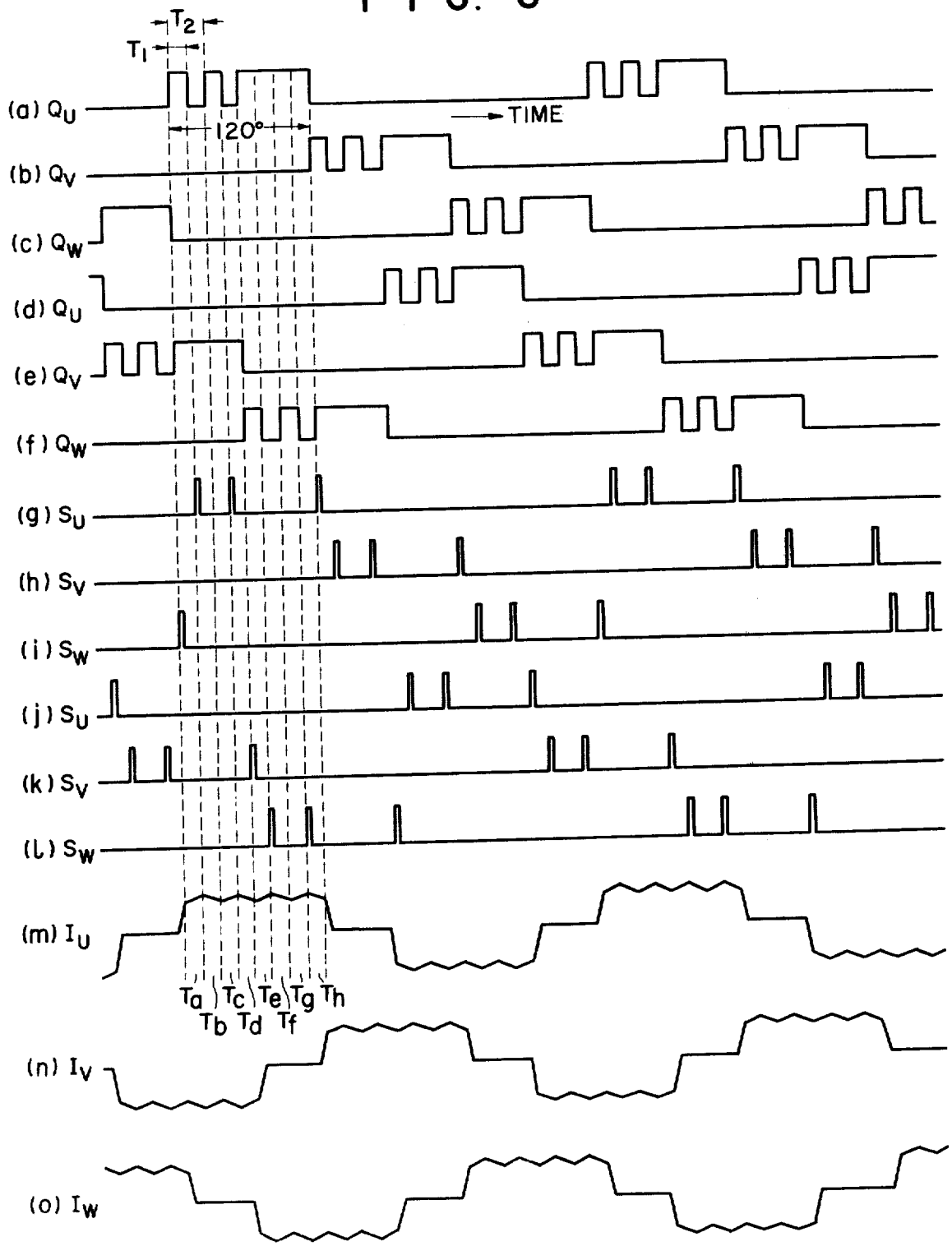
FIG. 6 shows waveforms of the currents flowing through various elements shown in FIG. 3.

In FIG. 6, curves $a$ through $f$ show current waveforms of respective main switching elements Qu, Qv, Qw, $Q\bar{u}$, $Q\bar{v}$ and $Q\bar{w}$, curves $j$ through $l$ show waveforms of the pulses applied to gate electrodes of respective auxiliary switching elements Su, Sv, Sw, $S\bar{u}$, $S\bar{v}$ and $S\bar{w}$ and curves $m$, $n$ and O show phase currents Iu, Iv and Iw, respectively flowing through the induction motor. As shown, each main switching element conducts current for 120° based on 360° period of the output alternating current and control signals are applied to control either the former half 60° or the latter half 60° in a time control scheme. Then, it is possible to obtain substantially rectangular current waves each having a width of 120° as shown by curves $m$, $n$ and $o$.

In the case shown in FIG. 6, the modulation frequency $f$ is 12 times the fundamental frequency $fo$ of the inverter output, and the output voltage of the inverter is controlled by adjusting the ratio $\alpha = T_1/T_2$ where $T_1$ represents the width and $T_2$ the period of the control pulse.

Figure 1:
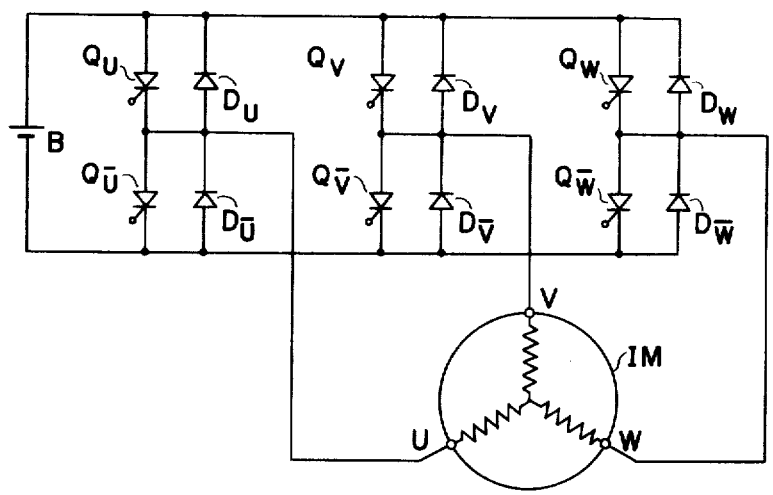
FIG. 1 is a simplified connection diagram of a prior art pulse width modulated type inverter.
Figure 2A:
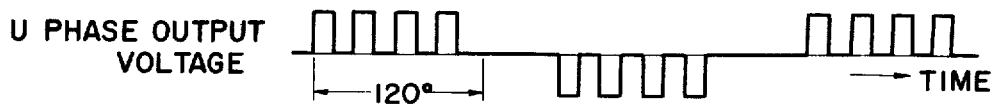
FIGS. 2a and 2b show waveforms of the output voltage and current of one phase of the inverter shown in FIG. 1.
Figure 2B:

Comparing the phase currents shown by curves $m$, $n$ and $o$ shown in FIG. 6 with the phase currents shown in FIG. 2 it will be noted that the former phase currents contain lesser high frequency components and that the waveforms of respective phases are symmetrical with respect to zero lines.

In the embodiment shown in FIG. 3, the main current paths established during an interval Ta – Th in which the $u$ phase current Iu flows are as follows. During an interval Ta or Tc, the current flows through a circuit including the positive terminal of sources B — Qu — $L_{Du}$ — U—V—$Q\bar{v}$— the negative terminal of source B for applying an energy to the load from the source. Since reactor winding $L_{Du}$ is included in this current path, the rate of increase of the current is low. During an interval Tb or Td, since main switching element Qu is turned OFF, free wheeling current flows through the load through a path including $L_{Du}$ — U — V — $Q\bar{v}$ — $S\bar{u}$ — $L_{Du}$. During this interval the electromagnetic energy stored in the DC reactor winding $L_{Du}$ is supplied to the load, thus maintaining the load current at substantially a constant value. During the next interval Te or Tg current now flows through a path including Qu — $L_{Du}$ — U — W — $Q\bar{w}$, thus supplying energy to the load from the source. During an interval Tf or Th the free wheeling current flows through a path including Qu — $L_{Du}$ — U — W — Sw. During this interval the energy stored in reactor winding $L_{Du}$ is supplied to the load. Then, when the main switching element Qv is turned ON, current flows from the source to the load through a circuit including Qv — $L_{Dv}$ — V — W — $Q\bar{w}$. Thus, the current is commutated from switching element Qu to Qv. To assist commutation any one of known commutation circuits, such as including a commutating capacitor and switching elements utilized to connect the commutating capacitor across a main switching element from which the current is to be transferred to another main switching element may be used.

In this manner, the main current is commutated among various main switching elements as shown in FIG. 6.

Figure 7:
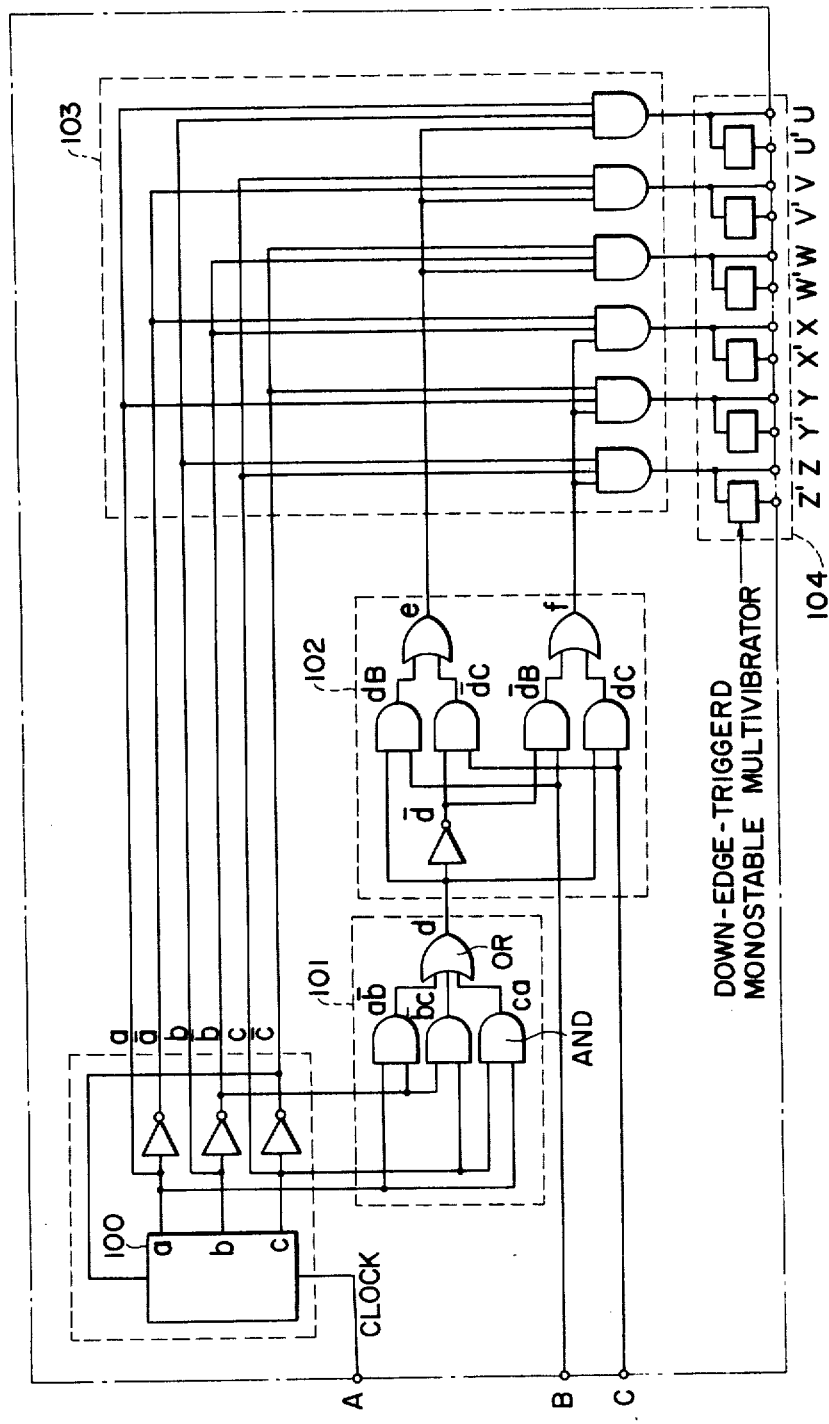
FIG. 7 is a connection diagram of a circuit for generating control pulses for controlling the current flowing through respective main switching elements in a manner as shown by curves $a$ through $f$ shown in FIG. 6.
Figure 8:
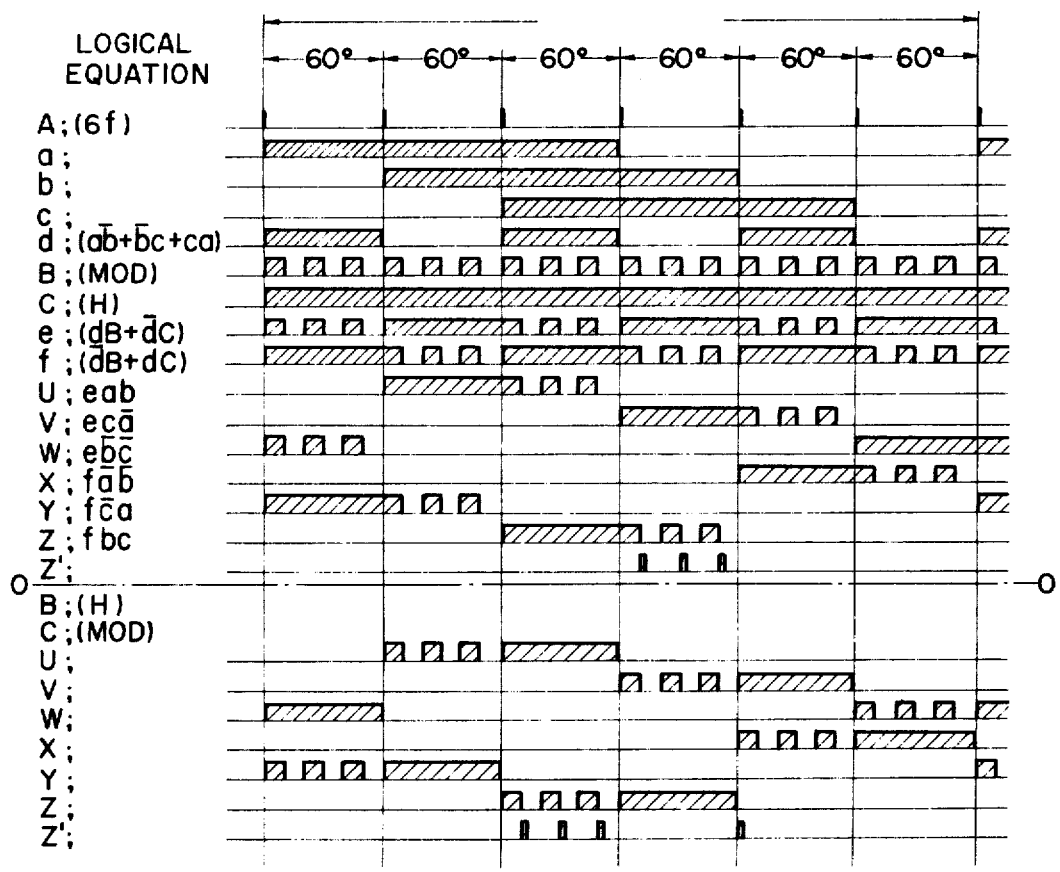
FIG. 8 shows waveforms of various signals at various portions of the circuit shown in FIG. 7.

FIG. 7 shows the connection diagram of one example of a circuit for generating control or gate signals for the main switching elements to control the former half 60° or the latter half 60° of the currents flowing through the main switching elements as shown in FIG. 6. The circuit shown in FIG. 7 comprises a 3 bit shift register 100 constituted by a 6 bit Johnson counter utilizing a signal (6f) applied to terminal A as a clock signal and is constructed to apply its outputs $a, \bar{a}, b, \bar{b}, c$ and $\bar{c}$ to terminals U, V, W, X, Y and Z. A first circuit 101 is provided including three AND gate circuits and one OR gate circuit which is connected such that the circuit 101 responds to the output from shift register 100 for producing a signal $d$ having a period of 60° and utilized to discriminate the former and latter halves of 120°. A second circuit 102 includes four AND gate circuits and two OR gate circuits which are connected to receive the output $d$ from the first circuit 101, and signals MOD and H having waveforms shown in FIG. 8 and applied to inputs B and C respectively for producing ON-OFF signals $e$ and $f$ for terminal groups U, V and W and X, Y and Z. A third circuit 103 includes 6 AND gate circuits connected to receive the outputs $a, \bar{a}, b, \bar{b}, c$ and $\bar{c}$ from the shift register 100 and the ON-OFF signals $e$ and $f$ for assigning the ON-OFF signals to terminal groups U, V, W and X, Y, Z. Signals produced on terminals U, V, W, X, Y and Z shown in FIG. 7 are used as the gate signals for the main switching elements Qu, Qv, Qw, $Q\bar{u}, Q\bar{v}$ and $Q\bar{w}$ shown in FIGS. 3, 4, 5, 10 and 11 and as the base signals for the transistors shown in FIG. 9. The outputs of respective AND gate circuits of the third circuit 103 are applied to a downedge triggered monostable multivibrator 104 to produce signals at terminals U' to Z' which are used as the gate signals for the auxiliary switching elements $S\bar{u}, S\bar{v}, S\bar{w}$, Su, Sv and Sw shown in FIGS. 3, 4, 5, 10 and 11. The waveforms of various signals utilized in the circuit shown in FIG. 7 and their logical equations are shown in FIG. 8. Under conditions shown above a line O — O, the current (load current) flowing through the main switching elements is chopped during the latter 60° interval. When the signals applied to inputs B and C are interchanged, that is when signal H is applied to input B and signal MOD to input C as shown beneath line O—O in FIG. 8, signals $e$ and $f$ are interchanged whereby the load currents are chopped during the former 60° interval.

The outputs at terminals U, V, W, X, Y and Z are expressed as follows in terms of $a, b, c$, A, B and C.

$$U = Cb\bar{c} + Bca$$
$$V = C\bar{a}b + B\bar{b}c$$
$$W = Cc\bar{a} + Bab$$
$$Y = Cab + Bb\bar{c}$$
$$Z = Cca + B\bar{a}\bar{b}$$

Various logical circuits described above are constructed to satisfy these logical equations.

Consequently, the output currents of the inverter have waveforms as shown by $m, n$ and $o$ in FIG. 6 which are substantially rectangular having a width of 120° and resemble those of the constant current type inverter. Thus, during the intervals in which the main switching elements are maintained OFF by the pulse width control the energy stored in respective windings of the reactor LD is supplied to the load as flywheel currents through the auxiliary switching elements so that it is possible to supply rectangular wave load current of 120° duration irrespective of the pulse width control, thus eliminating current pulsations having a frequency of the modulated pulse. Accordingly, it is possible to greatly decrease the iron loss, improve the overall efficiency and torque coefficient of an induction motor or a synchronous motor energized by the inverter. Further, since the output current of the inverter has a substantially rectangular waveform it is possible to limit the peak value of the load current thereby decreasing the capacity of the commutating circuit. When the inverter is combined with a constant voltage DC source and controlled by the pulse width modulation system a sufficient commutating voltage is ensured even when the inverter is operated at low frequencies so that no independent source is necessary for providing a required commutating voltage. This differs from a conventional rectifier inverter system in which the voltage is controlled by the rectifier and the frequency is controlled by the inverter, since, here, the voltage and frequency are controlled by the inverter and the control system can be simplified.

By using a constant modulation frequency for the control pulse of the inverter, troubles such as induction interference and distortion of the voltage and current waves on the source side which are caused by higher harmonics of the source which feeds a variable frequency inverter can readily be solved by using a simple filter. Further, by maintaining the modulation frequency at a constant value it is possible to decrease the capacity and physical size of the smoothing reactor $L_D$. When power transistors are used as the main switching elements it is possible to improve the current utilization factor thereof, whereas when SCRs are used as the main switching elements it is possible to decrease the capacity of the commutating capacitor.

It will be clear that the invention is also applicable to a single phase bridge connected inverter.

Any one of many well-known circuits may be used as the commutating circuit. A suitable commutating circuit comprises a pair of branch circuits connected across the DC source B, each including two serially connected controllable switching elements having the same polarity as the main switching elements and a commutating capacitor connected across the midpoints of the branch circuits. The controllable switching elements are controlled such that they charge the capacitor while a given main switching element is conducting and discharge the capacitor through the given main switching element when its current is to be commutated to the other main switching element.

Let us consider the advantageous operation of the multi-winding reactor $L_D$ during a commutation period from phase U to phase V, for example. Under the conditions, the following two circuits are established, one extending through $L_{Du} — u — w — Q\bar{w} — S\bar{u}$ which passes the free wheeling current, and the other extending through $Qv — L_{Dv} — v — w — Q\bar{w}$ which passes the load current. These two circuits are coupled together through windings $L_{Du}$ and $L_{Dv}$ which are wound on a common core. When the load current flowing through the second circuit tends to increase a back electromotive force is created across winding $L_{Dv}$ thereby inducing a voltage in winding $L_{Du}$ having a polarity opposite to that of the free wheeling current. Accordingly, the current flowing through the first circuit due to the residual inductance of the $u$ phase load is decreased rapidly. The current flowing through the second circuit is increased rapidly due to the coupling of the windings $L_{Du}$ and $L_{Dv}$ so as to prevent change of the total flux of the reactor $L_D$ thus completing the commutation from phase $u$ to phase $v$. During the commutation period the current Iw flowing through winding $w$ is maintained constant since Iw = In + Iv.

Figure 9:
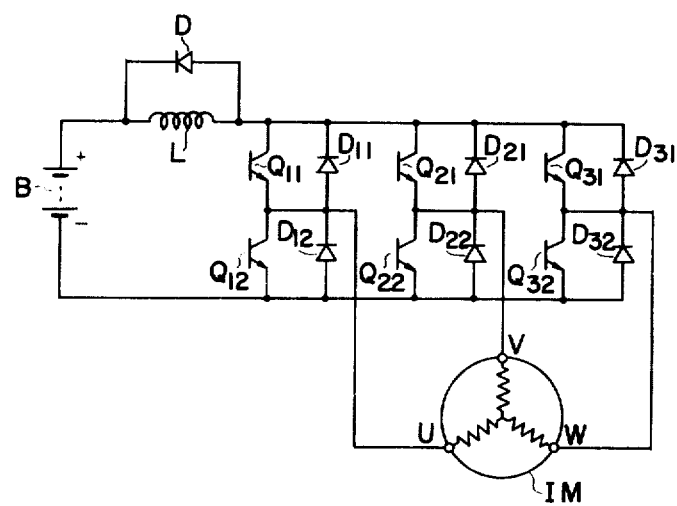
FIG. 9 shows a connection diagram of a modified embodiment of this invention and FIGS. 10 and 11 show modifications of the embodiment shown in FIG. 9.

FIG. 9 shows a modified embodiment of this invention in which power transistors $Q_{11}, Q_{12}, Q_{21}, Q_{22}, Q_{31}$ and $Q_{32}$ are bridge connected and free wheeling diodes $D_{11}$, $D_{12}$, $D_{21}$, $D_{22}$, $D_{31}$ and $D_{32}$ are connected in parallel opposition with respective transistors. In this case, the control or drive pulses generated by the circuit shown in FIG. 7 are applied to the base electrodes of respective transistors. A DC reactor L is connected between the DC source B and the inverter and a diode D having a polarity as shown is connected in parallel with the reactor L.

The operation of this embodiment is similar to that of the previous embodiment. Let us consider the operation between a time at which both transistors $Q_{11}$ and $Q_{22}$ are ON and a time at which transistor $Q_{22}$ is rendered OFF and transistor $Q_{32}$ is rendered ON thus commutating the current from V to W. At first the load current flows through L, $Q_{11}$, phases U and V and $Q_{22}$, and the load current is maintained at a substantially constant value by reactor L. As transistor $Q_{11}$ is turned OFF, at time Tb (see FIG. 6) current flows through a first circulating circuit including diode $D_{12}$, phases U and V and transistor $Q_{22}$. Circulating current also flows through a second circulating circuit including reactor L and diode D thus preventing attenuation of current flowing through the first and second circulating circuits. At time Tc transistor $Q_{11}$ is turned ON again to pass current through the circuit described above. At time Td, the transistor $Q_{11}$ is turned OFF again. The above description refers to the former 60° of the operating period 120° of transistor $Q_{11}$. At time Te in the latter 60° transistor $Q_{22}$ is turned OFF while at the same time transistor $Q_{32}$ is turned ON thus effecting commutation from phase V to phase W. At this time, the load current flows through reactor L, transistor $Q_{11}$, phase windings U and W and transistor $Q_{32}$. Again, the load current is maintained at the constant value by reactor L. At time Tf transistor $Q_{32}$ is turned OFF whereby a first circulating circuit including transistor $Q_{11}$, U and W phase windings of the induction motor IM and diode $D_{31}$, and a second circulating circuit including reactor L and diode D are formed thereby preventing attenuation of the currents circulating through these circuits. At times Tg and Th, similar operations are performed.

In this manner, according to this modification when the load current is supplied to the motor from source B, the load current is maintained at a substantially constant value by the series reactor L. When the load current is interrupted although the reactor L is not included in series with the motor windings, the motor windings are short circuited whereby the attenuation of the current is minimized. Consequently, the load currents are similar to those shown by curves m, n and o in FIG. 6. Although the ripple is slightly larger than that shown by curves m, n and o but smaller than that shown by FIG. 2b.

It will be clear that the transistors can be substituted by thyristers as in the previous embodiments.

Figure 10:
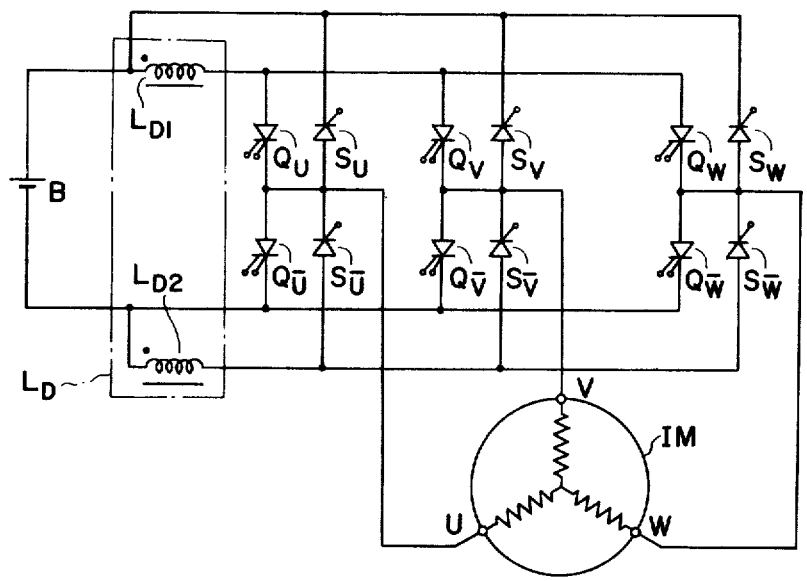

FIG. 10 shows a modification of the embodiment shown in FIG. 9 in which the DC reactor $L_D$ includes a first winding $L_{D1}$ connected between DC source B and the inverter and a second winding $L_{D2}$ magnetically coupled to the first winding $L_{D1}$ and wherein thyristors Qu, $Q\overline{u}$, Qv, $Q\overline{v}$, Qw and $Q\overline{w}$ acting as the main switching elements are connected in the same manner as the transistors shown in FIG. 9 and free wheeling thyristors Su, $S\overline{u}$, Sv, $S\overline{v}$, Sw and $S\overline{w}$ are connected in parallel with respective thyristors respectively through reactor windings $L_{D1}$ and $L_{D2}$. In this case, it is possible to use the same control circuit as that utilized for the embodiment shown in FIG. 3. Thus when thyristors Qu and $Q\overline{v}$ are turned ON as at times Ta and Tc the load current flows through a circuit including source B, reactor winding $L_{D1}$, thyristor Qu, phase windings u and v and thyristor $Q\overline{v}$, whereas when thyristor Qu is turned OFF and thyristor $S\overline{u}$ is turned ON as at times Tb and Td, circulating current flows through a circuit including reactor coil $L_{D2}$, thyristor $S\overline{u}$, phase windings u and v and thyristor $Q\overline{v}$. Since in this embodiment the DC reactor $L_D$ maintains constant the current flowing through the motor winding the same phase currents as those shown by curves m, n and o in FIG. 6 can be produced.

Instead of connecting the reactor winding $L_{D1}$ on the positive side of the DC source, it is also possible to connect the reactor winding on the negative side of the DC source.

Figure 11:
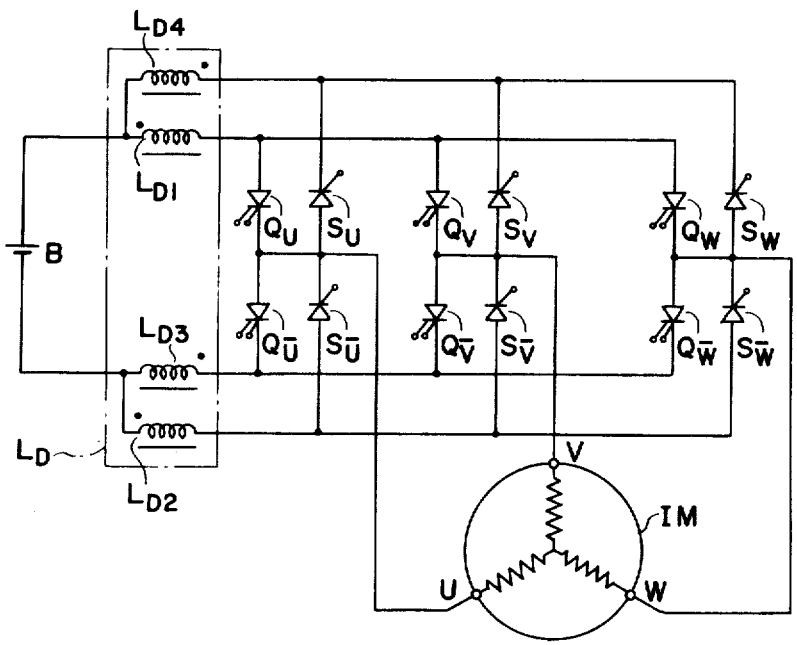

FIG. 11 shows a modification of the embodiment shown in FIG. 10 wherein the DC reactor $L_D$ comprises four windings $L_{D1}$, $L_{D2}$, $L_{D3}$ and $L_{D4}$ wound on the same magnetic core, of which windings $LD_1$ and $LD_3$ are connected on the positive and negative sides of the source. It will be clearly understood that this embodiment operates in the same manner as that shown in FIG. 10.

We claim:

1. Inverter apparatus comprising a source of direct current, a plurality of parallel branch circuits connected across said source, each branch circuit including a pair of serially connected controllable switching elements, a plurality of semiconductor elements connected in parallel opposition with respective controllable switching elements, an alternating current load connected to the junctures between said pair of serially connected controllable switching elements, a D.C. reactor connected between said source of direct current and said alternating current load, means connected across said D.C. reactor for preventing attenuation of the current flowing through said D.C. reactor, and a source of control pulses for rendering ON respective controllable switching elements in a predetermined sequence each for a 120° interval of the output alternating current, said source of control pulse including means for chopping the current flowing through each controllable switching element at a predetermined modulation frequency for the former or latter 60° interval of said 120° interval.

2. The inverter apparatus according to claim 1 wherein said reactor comprises a plurality of windings wound on a common magnetic core, each one of said branch circuits includes one of said controllable switching elements and one of said semiconductor elements which are connected in series opposition, and each one of said reactor windings is connected across junctures between said serially connected controllable switching elements and semiconductor elements of adjacent branch circuits whereby when a given controllable switching element is rendered OFF, the energy stored in a reactor winding connected in series therewith is supplied to said load through a semiconductor element connected in series opposition with said given controllable switching element and a controllable switching element in another branch circuit thereby preventing attenuation of the load current.

3. The inverter apparatus according to claim 2 wherein said alternating current load is connected to one sides of respective reactor windings.

4. The inverter apparatus according to claim 2 wherein said alternating current load comprises two polyphase alternating current motors which are connected to the opposite sides of respective reactor windings.

5. The inverter apparatus according to claim 2 wherein said alternating current load is connected to the midpoints of respective reactor windings.

6. The inverter apparatus according to claim 1 wherein said D.C. reactor is connected between said source of direct current and said plurality of branch circuits and provided with a diode connected in parallel with said reactor with a polarity such that when direct current supplied from said source and flowing through said reactor is interrupted said diode establishes a circuit for not dissipating the energy stored in said reactor.

7. The inverter apparatus according to claim 1 wherein said D.C. reactor includes two reactor windings wound on a common magnetic core, one reactor winding is connected between one pole of said source of direct current and said plurality of branch circuits, and the other reactor winding is connected between the other pole of said source of direct current and the junctures between serially connected controllable switching elements of respective branch circuits through said semiconductor.

8. The inverter apparatus according to claim 1 wherein said D.C. reactor comprises first to fourth reactor windings which are wound on a common magnetic core, the first reactor winding is connected between one pole of said source of direct current and said plurality of branch circuits, the second reactor winding is connected between the other pole of said source of direct current and said plurality of branch circuits, one ends of the third and fourth reactor windings are connected respectively to said one and the other poles of said source of direct current and the other ends of said third and fourth reactor windings are connected to the junctures between serially connected controllable switching elements respectively through said semiconductor elements.

9. The inverter apparatus according to claim 1, wherein said source of control pulses comprises:
a first logic circuit responsive to a clock signal for generating a plurality of output signals $a, \bar{a}, b, \bar{b}, c, \bar{c}$, where $\bar{a}, \bar{b}, \bar{c}$ are inverted with respect to $a, b, c$;
a second logic circuit coupled to said first logic circuit and having as input signals said output signals $a, \bar{b}, c$ and having an output signal $d = a\bar{b} + \bar{b}c + ac$;
a third logic circuit coupled to said second logic circuit and having as input signals $d$, B, C, where B is a modulated signal and C is a continuous signal, said third logic circuit having a first output signal $e = d\text{B} + \bar{d}\text{C}$, where $\bar{d}$ is inverted with respect to $d$, and a second output signal $f = \bar{d}\text{B} + d\text{C}$; and
a fourth logic circuit having as inputs selected combinations of outputs of said first and third logic circuits and having a plurality of outputs coupled to said respective controllable switching elements.

10. The inverter apparatus according to claim 10, wherein said fourth logic circuit comprises a plurality of AND logic gates, each of said AND gates having two inputs selected from outputs $a, \bar{a}, b, \bar{b}, c, \bar{c}$, of said first logic circuit and a third input selected from outputs $e, f$ of said third logic circuit.

* * * * *